US012585148B2

(12) United States Patent
Lin et al.

(10) Patent No.: US 12,585,148 B2
(45) Date of Patent: Mar. 24, 2026

(54) DISPLAY DEVICE

(71) Applicant: AUO Corporation, Hsinchu City (TW)

(72) Inventors: Yu-Syuan Lin, Hsinchu City (TW);
Chun-Liang Lin, Hsinchu City (TW);
Chun-Ting Hsiao, Hsinchu City (TW);
Peng-Yu Chen, Hsinchu City (TW);
Chih-Hung Tsai, Hsinchu City (TW)

(73) Assignee: AUO CORPORATION, Hsinchu City
(TW)

( * ) Notice: Subject to any disclaimer, the term of this
patent is extended or adjusted under 35
U.S.C. 154(b) by 0 days.

(21) Appl. No.: 18/903,014

(22) Filed: Oct. 1, 2024

(65) Prior Publication Data

US 2025/0147349 A1 May 8, 2025

(30) Foreign Application Priority Data

Nov. 8, 2023 (TW) .................................. 112143088

(51) Int. Cl.
G02F 1/13 (2006.01)
G02F 1/1335 (2006.01)
G02F 1/13363 (2006.01)

(52) U.S. Cl.
CPC ...... G02F 1/1323 (2013.01); G02F 1/133541
(2021.01); G02F 1/133636 (2013.01)

(58) Field of Classification Search
CPC ............. G02F 1/1323; G02F 1/133541; G02F
1/133636
See application file for complete search history.

(56) References Cited

U.S. PATENT DOCUMENTS

| | | | | |
|---|---|---|---|---|
| 5,296,952 A | * | 3/1994 | Takatsu | G02F 1/13476 |
| | | | | 349/88 |
| 2019/0258101 A1 | * | 8/2019 | Yasui | G02F 1/137 |
| 2020/0219467 A1 | * | 7/2020 | Okamoto | G06N 3/045 |
| 2022/0123183 A1 | | 4/2022 | Kim et al. | |
| 2022/0140144 A1 | * | 5/2022 | Yamazaki | H05B 33/14 |
| | | | | 257/288 |
| 2022/0163828 A1 | | 5/2022 | Jitsui | |
| 2023/0335694 A1 | | 10/2023 | Kim et al. | |

FOREIGN PATENT DOCUMENTS

| | | | | |
|---|---|---|---|---|
| CN | 213987120 U | 8/2021 | | |
| TW | I756820 B | 3/2022 | | |
| TW | I848525 B | 7/2024 | | |
| WO | WO-2020252890 A1 | * 12/2020 | | G02F 1/13 |

* cited by examiner

*Primary Examiner* — Lucy P Chien
(74) *Attorney, Agent, or Firm* — WPAT, PC

(57) ABSTRACT

A display device includes a display panel and a switch panel.
The switch panel includes a first substrate disposed on the
display panel, a shielding pattern layer, a light transmitting
layer, pixel electrodes disposed on the light transmitting
layer, a second substrate disposed on the pixel electrodes,
and the liquid crystal layer disposed between the first
substrate and the second substrate. The shielding pattern
layer is disposed on the first substrate and includes opening
parts and light shielding parts arranged alternately with the
opening parts. Each of the light shielding parts has a first
thickness. The light transmitting layer is disposed on the
shielding pattern layer and includes filling parts filling the
opening parts and extending parts arranged alternately with
the filling parts. Each of the filling parts has a second
thickness greater than the first thickness.

19 Claims, 5 Drawing Sheets

1

DISPLAY DEVICE

CROSS-REFERENCE TO RELATED APPLICATION

This application claims priority to Taiwan Application Serial Number 112143088, filed Nov. 8, 2023, which is herein incorporated by reference in its entirety.

BACKGROUND

Field of Invention

The present disclosure relates to a display device. More particularly, the present disclosure relates to a display device including a switch panel disposed on a display panel.

Description of Related Art

Generally, display devices usually have a wide viewing angle. However, in some situations or occasions, such as when a user browses a private web page, confidential information, or enters a password in public, the wide viewing angle display may easily cause the display image to be peeked at by bystanders and result in leakage of confidential information. Therefore, how to respond to viewing modes with different viewing angles, such as a share mode with a wide viewing angle and a privacy mode with a narrow viewing angle, and develop a display device that facilitates switching of viewing angles and has excellent display quality in different viewing modes has become one of the goals in this technology field.

SUMMARY

At least one embodiment of the present disclosure provides a display device including a switch panel disposed on a display panel, a shielding pattern layer disposed between a liquid crystal layer of the switch panel and the display panel, and a light transmitting layer and between the liquid crystal layer and the shielding pattern layer, in order to facilitate switching of viewing modes at different viewing angles and to maintain or enhance the display quality of the viewing modes at different viewing angles.

The display device according to at least one embodiment of the present disclosure includes a display panel and a switch panel. The switch panel includes a first substrate, a shielding pattern layer, a light transmitting layer, multiple pixel electrodes, a second substrate, and a liquid crystal layer. The first substrate is disposed on the display panel. The shielding pattern layer is disposed on the first substrate and includes multiple opening parts and multiple light shielding parts arranged alternately with the opening parts. Each of the light shielding parts has a first thickness. The light transmitting layer is disposed on the shielding pattern layer and includes multiple filling parts filling the opening parts and multiple extending parts arranged alternately with the filling parts. Each of the filling parts has a second thickness, and the second thickness is greater than the first thickness. The pixel electrodes are disposed on the light transmitting layer. The second substrate is disposed on the pixel electrodes. The liquid crystal layer is disposed between the first substrate and the second substrate.

The display device according to at least another embodiment of the present disclosure includes a self-luminous display panel, a switch panel, and a circular polarizer. The switch panel includes a first substrate, a shielding pattern layer, a light transmitting layer, multiple pixel electrodes, a second substrate, and a liquid crystal layer. The first substrate is disposed on the display panel. The shielding pattern layer is disposed on the first substrate and includes multiple opening parts and multiple light shielding parts arranged alternately with the opening parts. Each of the light shielding parts has a first thickness. The light transmitting layer is disposed on the shielding pattern layer and includes multiple filling parts filling the opening parts and multiple extending parts arranged alternately with the filling parts. Each of the filling parts has a second thickness, and the second thickness is greater than the first thickness. The pixel electrodes are disposed on the light transmitting layer. The second substrate is disposed on the pixel electrodes. The liquid crystal layer is disposed between the first substrate and the second substrate. The circular polarizer is disposed between the self-luminous display panel and the switch panel.

DETAILED DESCRIPTION

Figure 1A:
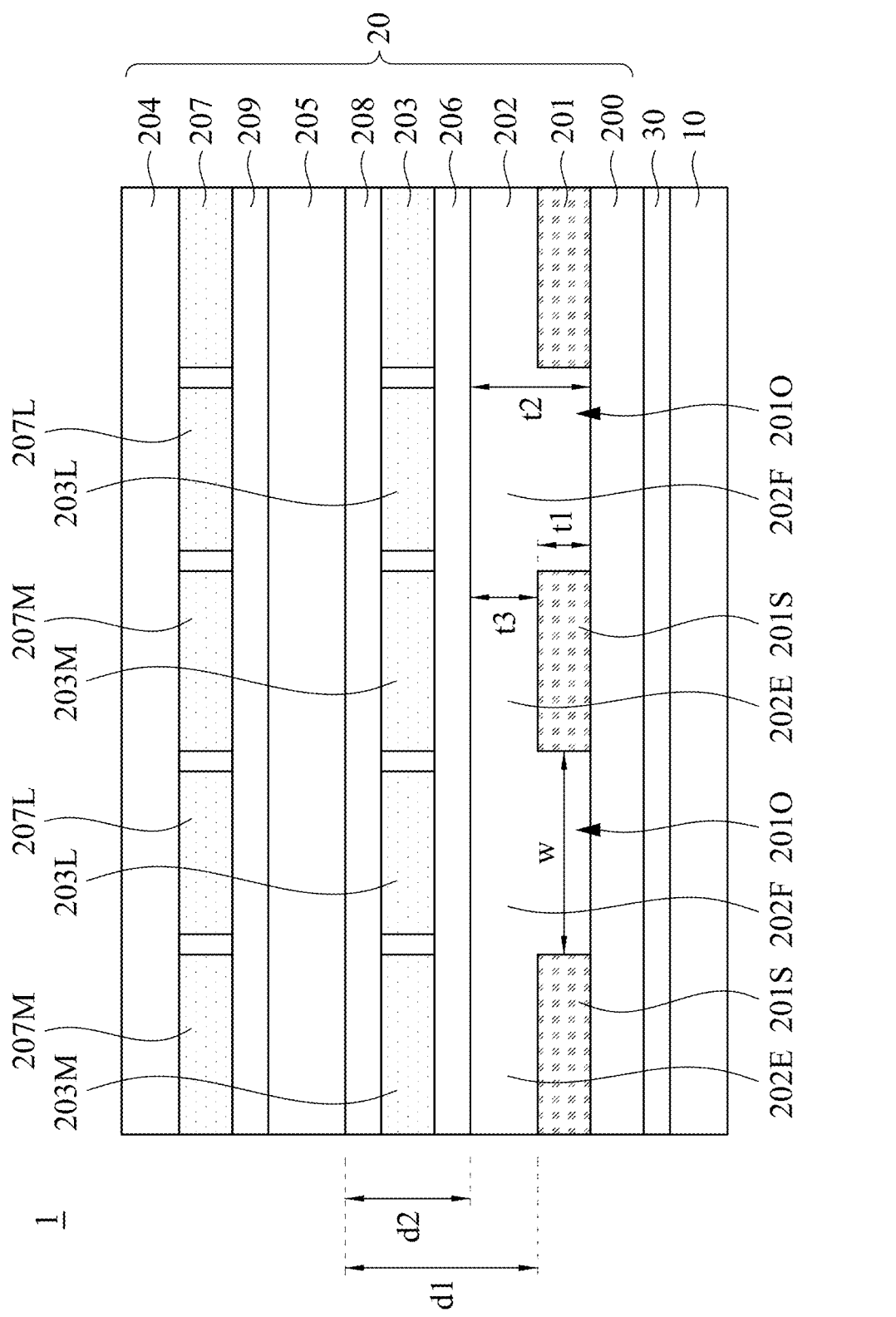
FIG. 1A is a partial schematic cross-sectional view of a display device according to at least one embodiment of the present disclosure.

In the following description, in order to clearly present the technical features of the present disclosure, the dimensions (such as length, width, thickness, and depth) of elements (such as layers, films, substrates, and areas) in the drawings will be enlarged in unequal proportions. Therefore, the description and explanation of the following embodiments are not limited to the sizes and shapes presented by the elements in the drawings, but should cover the sizes, shapes, and deviations of the two due to actual manufacturing processes and/or tolerances. For example, the flat surface shown in the drawings may have rough and/or non-linear characteristics, and the acute angle shown in the drawings may be round. Therefore, the elements presented in the drawings in this case are mainly for illustration, and are not intended to accurately depict the actual shape of the elements, nor are they intended to limit the scope of patent applications in this case.

Furthermore, the words "about", "approximately" or "substantially" used in the present disclosure not only cover the clearly stated numerical values and numerical ranges, but also cover those that can be understood by a person with ordinary knowledge in the technical field to which the present disclosure belongs. The permissible deviation range can be determined by the error generated during measurement, and the error is caused, for example, by limitations of the measurement system or process conditions. For example, two objects (such as the plane or traces of a substrate) are "substantially parallel" or "substantially perpendicular," where "substantially parallel" and "substantially perpendicular," respectively, mean that parallelism and perpendicularity between the two objects can include non-parallelism and non-perpendicularity caused by permissible deviation ranges.

In addition, "about" may mean within one or more standard deviations of the above values, such as within ±30%, ±20%, ±10%, or ±5%. Such words as "about", "approximately", or "substantially" as appearing in the present disclosure may be used to select an acceptable range of deviation or standard deviation according to optical properties, etching properties, mechanical properties, or other properties, rather than applying all of the above optical properties, etching properties, mechanical properties, and other properties with a single standard deviation.

The spatial relative terms used in the present disclosure, such as "below," "under," "above," "on," and the like, are intended to facilitate the recitation of a relative relationship between one element or feature and another as depicted in the drawings. The true meaning of these spatial relative terms includes other orientations. For example, the relationship between one element and another may change from "below" and "under" to "above" and "on" when the drawing is turned 180 degrees up or down. In addition, spatially relative descriptions used in the present disclosure should be interpreted in the same manner.

It should be understood that while the present disclosure may use terms such as "first", "second", "third" to describe various elements or features, these elements or features should not be limited by these terms. These terms are primarily used to distinguish one element from another, or one feature from another. In addition, the term "or" as used in the present disclosure may include, as appropriate, any one or a combination of the listed items in association.

Moreover, the present disclosure may be implemented or applied in various other specific embodiments, and the details of the present disclosure may be combined, modified, and altered in various embodiments based on different viewpoints and applications, without departing from the idea of the present disclosure.

FIG. 1A is a partial schematic cross-sectional view of a display device 1 according to at least one embodiment of the present disclosure. Referring to FIG. 1A, the display device 1 includes a display panel 10 and a switch panel 20. The switch panel 20 includes a first substrate 200, a shielding pattern layer 201, a light transmitting layer 202, multiple pixel electrodes 203, a second substrate 204 and a liquid crystal layer 205. The first substrate 200 is disposed on the display panel 10. The shielding pattern layer 201 is disposed on the first substrate 200 and includes multiple opening parts 201O and multiple light shielding parts 201S arranged alternately with the opening parts 201O. Each of the light shielding parts 201S has a first thickness t1. The light transmitting layer 202 is disposed on the shielding pattern layer 201 and includes multiple filling parts 202F filling the opening parts 201O and multiple extending parts 202E arranged alternately with the filling parts 202F. Each of the filling parts 202F has a second thickness t2 greater than the first thickness t1. The pixel electrodes 203 are disposed on the light transmitting layer 202. The second substrate 204 is disposed on the pixel electrodes 203. The liquid crystal layer 205 is disposed between the first substrate 200 and the second substrate 204.

By disposing the switch panel 20 on the display panel 10 and being independent of the display panel 10, viewing modes with different viewing angles can be conveniently switched. Furthermore, by disposing the shielding pattern layer 201 between the liquid crystal layer 205 of the switch panel 20 and the display panel 10 and disposing the light transmitting layer 202 between the liquid crystal layer 205 and the shielding pattern layer 201, and the second thickness t2 of the filling part 202F of the light transmitting layer 202 is greater than the first thickness t1 of the light shielding part 201S of the shielding pattern layer 201, in addition to achieving a narrow viewing angle requirement for the privacy mode, the brightness requirement for the share mode with wide viewing angle also can be achieved to maintain or enhance the display quality for different viewing angles.

As shown in FIG. 1A, each of the extending parts 202E has a third thickness t3, and the third thickness t3 is 0.5 times and 1.5 times of the first thickness t1. There is a first distance d1 between each of the light shielding parts 201S and the liquid crystal layer 205, each of the opening parts 201O has a width w, the first distance d1 is not greater than the width w. There is a second distance d2 between the light transmitting layer 202 and the liquid crystal layer 205, and the second distance d2 is in a range from 0.1 μm to 0.5 μm. In addition, the sum of the first thickness t1, the first distance d1 and the thickness of the liquid crystal layer 205 is not less than 2.5 times of the width w of the opening part 201O. With the aforementioned design relationship and range of values for thickness, width, and distance, the display quality of different viewing angles can be further enhanced by effectively meeting the narrow viewing angle requirement of the privacy mode and maintaining the brightness requirement of the share mode with wide viewing angle.

Referring to FIG. 1A, the pixel electrodes 203 includes multiple light emitting pixel electrodes 203L corresponding to the opening parts 201O, and multiple switch pixel electrodes 203M corresponding to the light shielding parts 201S. The light emitting pixel electrodes 203L are arranged alternately with the switch pixel electrodes 203M. In addition, the switch panel 20 further includes a counter electrode 207. The counter electrode 207 is disposed on the light transmitting layer 202 and includes multiple light emitting electrode patterns 207L corresponding to the light emitting pixel electrodes 203L, and multiple of switch electrode patterns 207M corresponding to the switch pixel electrodes 203M. The light emitting electrode patterns 207L are arranged alternately with the switch electrode patterns 207M.

Specifically, in the normal line of the first substrate 200, the light emitting pixel electrodes 203L overlap with the opening parts 201O, the switch pixel electrodes 203M overlap with the light shielding parts 201S, the light emitting electrode patterns 207L overlap with the light emitting pixel electrodes 203L, the switch electrode patterns 207M overlap with the switch pixel electrodes 203M, the filling parts 202F of the light transmitting layer 202 overlap with the opening parts 201O, and the extending parts 202E of the light transmitting layer 202 overlap with the light shielding parts 201S.

In addition, the light emitting pixel electrodes 203L has the same extending direction with the opening parts 201O, the switch pixel electrodes 203M has the same extending direction with the light shielding parts 201S, the light emitting electrode patterns 207L has the same extending direction with the light emitting pixel electrodes 203L, the switch electrode patterns 207M has the same extending direction with the switch pixel electrodes 203M, the filling parts 202F of the light transmitting layer 202 has the same extending direction with the opening parts 201O, and the extending parts 202E of the light transmitting layer 202 has the same extending direction with the light shielding parts 201S.

As shown in FIG. 1A, the pixel electrodes 203 are disposed between the liquid crystal layer 205 and the light transmitting layer 202, the counter electrode 207 is disposed between the second substrate 204 and the liquid crystal layer 205, and the switch panel 20 further includes an insulating layer 206, where the insulating layer 206 is disposed between the light transmitting layer 202 and the pixel electrodes 203, and is directly in contact with the pixel electrodes 203, but the present disclosure is not limited thereto. In other embodiments, the pixel electrodes 203 may be disposed between the second substrate 204 and the liquid crystal layer 205, the counter electrode 207 may be disposed between the liquid crystal layer 205 and the light transmitting layer 202, and the switch panel 20 further includes an insulating layer 206, where insulating layer 206 is disposed between the light transmitting layer 202 and the counter electrode 207, and is directly in contact with the counter electrode 207. By disposing the insulating layer 206 between the light transmitting layer 202 and the pixel electrode 203 or between the light transmitting layer 202 and the counter electrode 207 to be directly in contact with the pixel electrodes 203 or the counter electrode 207, the adhesion between the light transmitting layer 202 and the pixel electrode 203 or between the light transmitting layer 202 and the counter electrode 207 can be enhanced to improve reliability. However, the present disclosure is not limited thereto. In other embodiments, the insulating layer 206 may not be provided, that is, the pixel electrodes 203 or the counter electrode 207 may be directly in contact with the light transmitting layer 202.

The switch panel 20 further includes an alignment layer 208 and a counter alignment layer 209. The alignment layer 208 is disposed between the pixel electrodes 203 and the liquid crystal layer 205, and the counter alignment layer 209 is disposed between the counter electrode 207 and the liquid crystal layer 205. In some embodiments, the alignment direction of the alignment layer 208 and the counter alignment layer 209 is parallel to the extending direction of the light shielding parts 201S of the shielding pattern layer 201. In addition, as shown in FIG. 1, the display device 1 further includes a polarizer 30 disposed between the display panel 10 and the switch panel 20. The polarizer 30 transmits vertical polarized light and absorbs horizontal polarized light.

In some embodiments, the display panel 10 may be a self-luminous display panel, such as a micro light emitting diode (micro LED, μLED) panel or an organic light emitting diode (OLED) panel. In addition, the polarizer 30 may be a circular polarizer, which can reduce the reflectivity of the display panel 10 to improve contrast. In some embodiments, the materials of the first substrate 200 and the second substrate 204 may be quartz, glass, polymer materials, and/or other suitable materials. In some embodiments, the material of the shielding pattern layer 201 may be black photoresist, black ink, or other suitable materials.

In some embodiments, the material of the light transmitting layer 202 and the insulating layer 206 may be an inorganic insulating material, an organic insulating material, or a combination thereof. The inorganic insulating material may be silicon oxide, silicon nitride, silicon oxynitride, etc., and the organic insulating material may be polymethylmethacrylate (PMMA), siloxane, polyimide (PI), epoxy, optical clear adhesive (OCA), optical clear resin (OCR) or other suitable materials. For example, the material of the light transmitting layer 202 is an organic insulating material, and the material of the insulating layer 206 is an inorganic insulating material. Through the aforementioned material selection, the light transmitting layer 202 has a more appropriate thickness, which can effectively meet the narrow viewing angle requirement of the privacy mode and achieve the brightness requirement of the share mode with wide viewing angle, so as to maintain or enhance the display quality for different viewing angles, and the insulating layer 206 can increase the adhesion between the pixel electrodes 203 and the light transmitting layer 202 or the adhesion between the counter electrode 207 and the light transmitting layer 202 to improve reliability.

In some embodiments, the materials of the pixel electrodes 203 and the counter electrode 207 may be indium tin oxide (ITO), indium zinc oxide (IZO), aluminum tin oxide (ATO), aluminum zinc oxide (AZO), indium germanium zinc oxide (IGZO) or other suitable materials. In some embodiments, the materials of the alignment layer 208 and the counter alignment layer 209 may be polyimide, polyamic acid (PAA) or other suitable materials. In some embodiments, the shielding pattern layer 201, the light transmitting layer 202, the pixel electrodes 203, the insulating layer 206, the counter electrode 207, the alignment layer 208 and the counter alignment layer 209 may be formed by a deposition process, an inkjet process, a printing process, a coating process, a lithography process, an etching process or other appropriate processes.

In some embodiments, the liquid crystal layer 205 may be an electrically controlled birefringence (ECB) liquid crystal layer, a high twisted nematic (HTN) liquid crystal layer, a vertical alignment (VA) liquid crystal layer, or other suitable liquid crystal layers. The liquid crystal layer 205 further includes a dye incorporated into the liquid crystal. In addition, the liquid crystal layer 205 forms a dark state or a bright state correspondingly in different power supply modes, so that the display device 1 has a privacy mode and a share mode. In some embodiments, the liquid crystal layer 205 of the display device 1 is the electrically controlled birefringence liquid crystal layer or the vertical alignment liquid crystal layer, compared with the liquid crystal layer 205 of the display device 1 being the high twisted nematic liquid crystal layer, the dye concentration incorporated into the liquid crystal may be lower, for example, it can be half of the highly twisted nematic liquid crystal layer. Therefore, the display device 1 with the electrically controlled birefringence liquid crystal layer or the vertical alignment liquid crystal layer, compared with the display device 1 with the high twisted nematic liquid crystal layer, the transmittance can be improved and the power consumption can be reduced. For example, the transmittance of the display device 1 with the electrically controlled birefringence liquid crystal layer or the vertical alignment liquid crystal layer can be twice of the display device 1 with the highly twisted nematic liquid crystal layer, and the power consumption of the display device 1 with the electrically controlled birefringence liquid crystal layer or the vertical alignment liquid crystal layer can be half of the display device 1 with the highly twisted nematic liquid crystal layer.

Figure 1B:
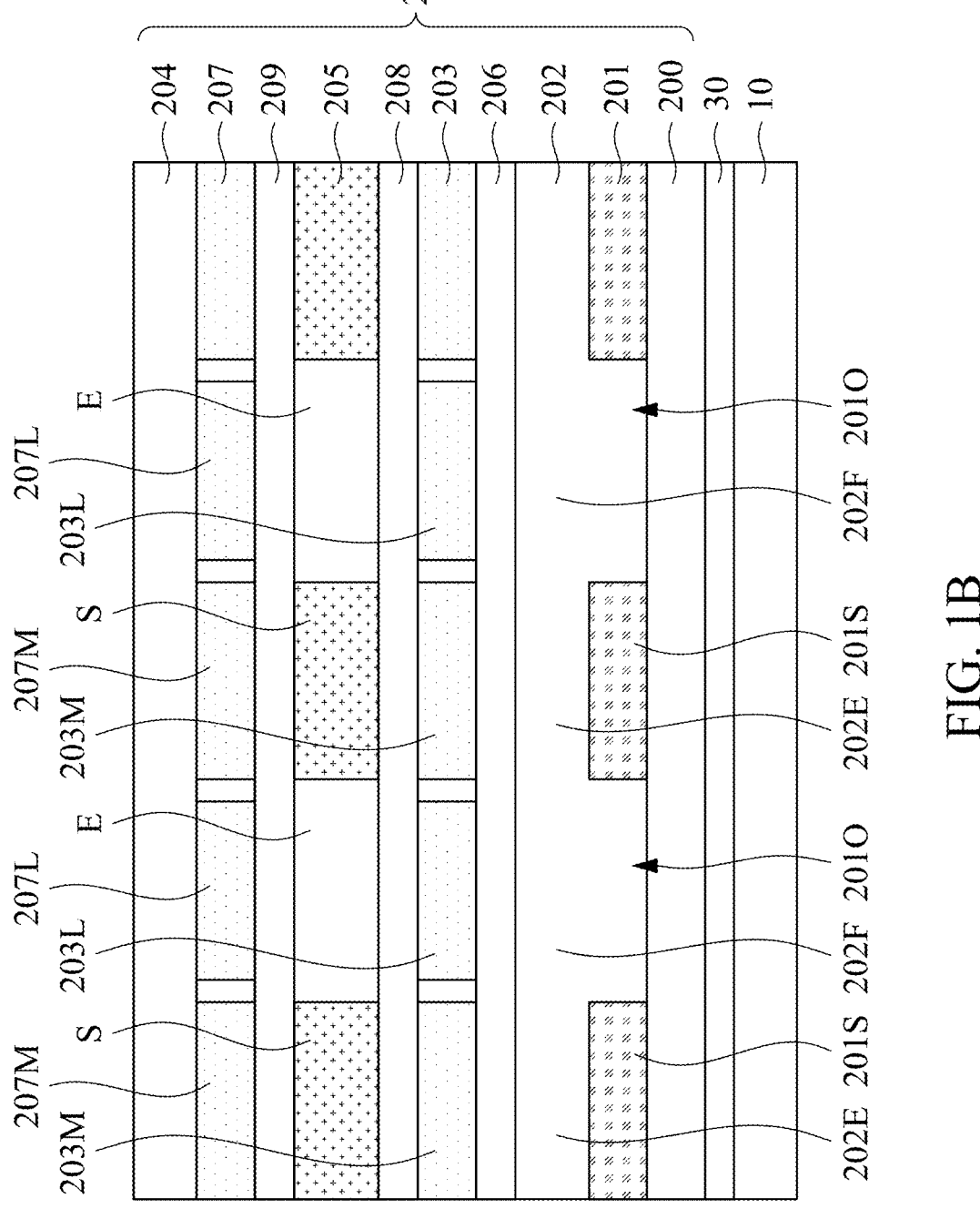
FIG. 1B is a partial schematic cross-sectional view of a display device at a privacy mode according to at least one embodiment of the present disclosure.

FIG. 1B is a partial schematic cross-sectional view of a display device 1 at a privacy mode according to at least one embodiment of the present disclosure, and FIG. 1A can be a partial schematic cross-sectional view of a display device 1 at a share mode according to at least one embodiment of the present disclosure. As shown in FIG. 1B, when the display device 1 is in the privacy mode, since the light emitting pixel electrodes 203L correspond to the opening parts 201O, the switch pixel electrodes 203M correspond to the light shielding parts 201S, and the light emitting pixel electrodes 203L and the switch pixel electrodes 203M are in different power receiving modes, so that a portion of the liquid crystal layer 205 corresponding to the light emitting pixel electrodes 203L is in a bright state to form light emitting areas E, and the other portion of the liquid crystal layer 205 corresponding to the switch pixel electrodes 203M is in a dark state to form light shielding areas S to make the display device 1 be in the privacy mode with narrow viewing angle. As shown in FIG. 1A, when the display device 1 is in the share mode, the light emitting pixel electrodes 203L and the switch pixel electrodes 203M are in the same power receiving mode, so that all the liquid crystal layer 205 is in a bright state to make the display device 1 be in the share mode with wide viewing angle. In some embodiments, when the display device 1 is in the privacy mode or in the share mode, the light emitting electrode patterns 207L of the counter electrode 207 and the light emitting pixel electrode 203L are in the same power receiving mode, and the switch electrode patterns 207M of the counter electrode 207 and the switch pixel electrodes 203M are in the same power receiving mode.

In other words, when the display device 1 is in the privacy mode, the voltages received by the light emitting pixel electrodes 203L and the switch pixel electrodes 203M are different. For example, the voltage received by one of the light emitting pixel electrodes 203L and the switch pixel electrodes 203M is not equal to zero, and the voltage received by the other of the light emitting pixel electrodes 203L and the switch pixel electrodes 203M is equal to zero. When the display device 1 is in the share mode, the voltages received by the light emitting pixel electrodes 203L and the switch pixel electrodes 203M are the same, for example, the same voltage different from zero or the same voltage equal to zero.

For example, the liquid crystal layer 205 is the electrically controlled birefringence liquid crystal layer or the highly twisted nematic liquid crystal layer, when the display device 1 is in the privacy mode, the display device 1 provides voltage to the light emitting pixel electrodes 203L, but does not provide voltage to the switch pixel electrodes 203M, that is, the voltage received by the light emitting pixel electrodes 203L is not equal to zero, and the voltage received by the switch pixel electrodes 203M is equal to zero; when the display device 1 is in the share mode, the display device 1 provides voltage to the light emitting pixel electrodes 203L and the switch pixel electrodes 203M, that is, the voltage received by the light emitting pixel electrodes 203L and the switch pixel electrodes 203M is not equal to zero.

Similarly, when the display device 1 is in the privacy mode, the display device 1 provides voltage to the light emitting electrode patterns 207L, but does not provide voltage to the switch electrode patterns 207M, that is, the voltage received by the light emitting electrode patterns 207L is not equal to zero, and the voltage received by the switch electrode patterns 207M is equal to zero; when the display device 1 is in the share mode, the display device 1 provides voltage to the light emitting electrode patterns 207L and the switch electrode patterns 207M, that is, the voltage received by the light emitting electrode patterns 207L and the switch electrode patterns 207M is not equal to zero.

The liquid crystal layer 205 is the vertical alignment liquid crystal layer, when the display device 1 is in the privacy mode, the display device 1 provides voltage to the switch pixel electrodes 203M, but does not provide voltage to the light emitting pixel electrodes 203L, that is, the voltage received by the switch pixel electrodes 203M is not equal to zero, and the voltage received by the light emitting pixel electrodes 203L is equal to zero; when the display device 1 is in the share mode, the display device 1 does not provide voltage to the light emitting pixel electrodes 203L and the switch pixel electrodes 203M, that is, the voltage received by the light emitting pixel electrodes 203L and the switch pixel electrodes 203M is equal to zero.

Similarly, when the display device 1 is in the privacy mode, the display device 1 provides voltage to the switch electrode patterns 207M, but does not provide voltage to the light emitting electrode patterns 207L, that is, the voltage received by the switch electrode patterns 207M is not equal to zero, and the voltage received by the light emitting electrode patterns 207L is equal to zero; when the display device 1 is in the share mode, the display device 1 does not provide voltage to the light emitting electrode patterns 207L and the switch electrode patterns 207M, that is, the voltage received by the light emitting electrode patterns 207L and the switch electrode patterns 207M is equal to zero.

Figure 2:
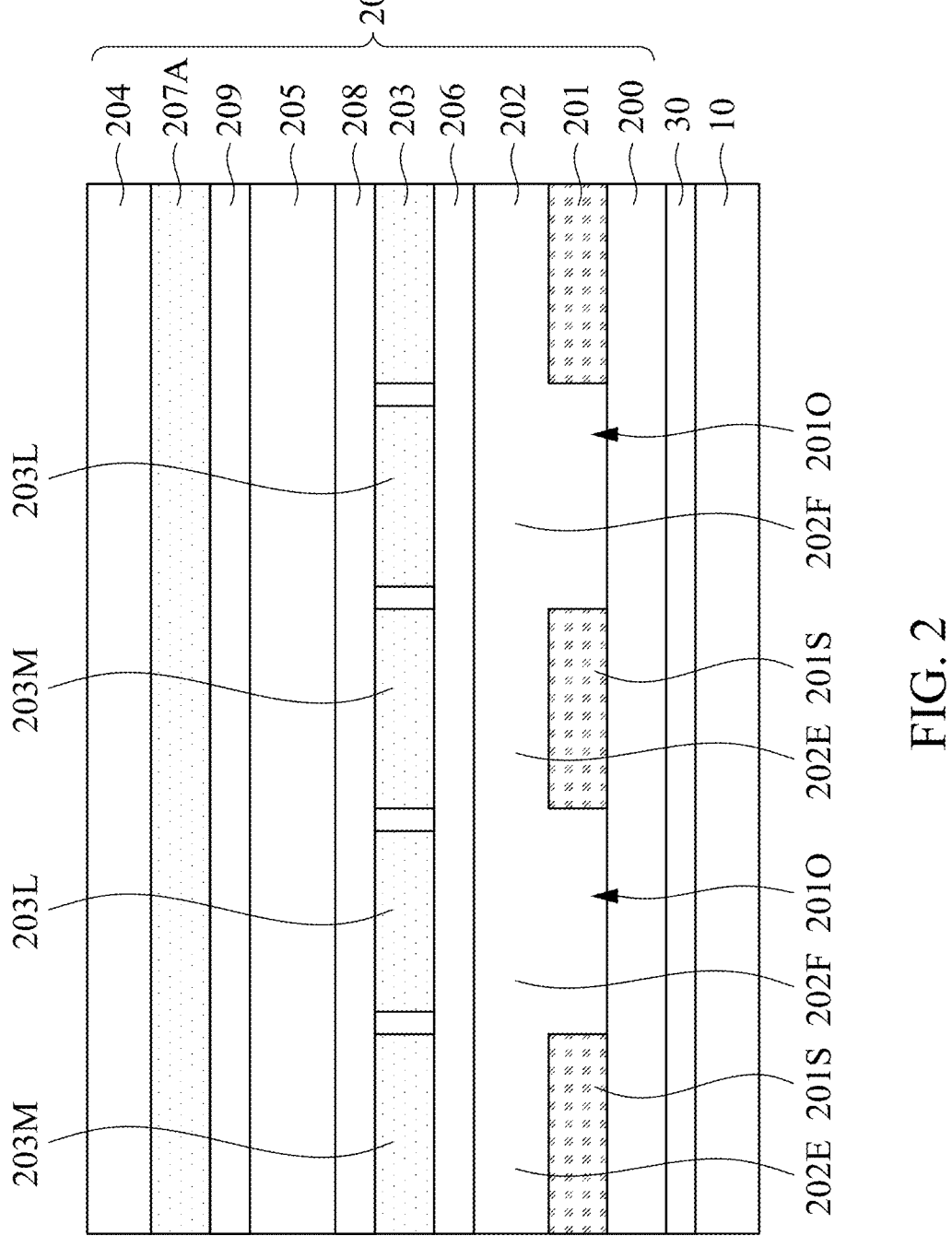
FIG. 2 is a partial schematic cross-sectional view of a display device according to at least another embodiment of the present disclosure.

FIG. 2 is a partial schematic cross-sectional view of a display device 1A according to at least another embodiment of the present disclosure. Referring to FIG. 2, the structures, the materials, the manufacturing processes and the relative positions of most elements in the embodiments of FIG. 2 and FIG. 1A are the same, so the same features are not repeated here. The difference between the embodiments of FIG. 2 and FIG. 1A is that the counter electrode 207A of the display device 1A in FIG. 2 is a common electrode layer, that is, the counter electrode 207A is a single continuous electrode layer instead of multiple electrode patterns that are separated from each other.

When the display device 1A is in the privacy mode, the voltages received by the light emitting pixel electrodes 203L and the switch pixel electrodes 203M are different, and the voltage received by the counter electrode 207A is the same as the voltage received by the light emitting pixel electrodes 203L or the switch pixel electrodes 203M; when the display device 1A is in the share mode, the voltages received by the light emitting pixel electrodes 203L and the switch pixel electrodes 203M are the same, but the voltage received by the counter electrode 207A is different from the voltages received by the light emitting pixel electrodes 203L and the switch pixel electrodes 203M, or is the same as the voltages received by the light emitting pixel electrodes 203L and the switch pixel electrodes 203M.

For example, the liquid crystal layer 205 is the electrically controlled birefringence liquid crystal layer or the highly twisted nematic liquid crystal layer, when the display device 1A is in the privacy mode, the display device 1A provides voltage not equal to zero to the switch pixel electrodes 203M and provides voltage to the counter electrode 207A as same as the voltage provided to the switch pixel electrodes 203M, and provides voltage not equal to zero to the light emitting pixel electrodes 203L different from the voltage provided to the switch pixel electrodes 203M, that is, the voltages received by the switch pixel electrodes 203M and the counter electrode 207A are the same, but different from the voltage received by the light emitting pixel electrodes 203L; when the display device 1A is in the share mode, the display device 1A provides voltage not equal to zero to the switch pixel electrodes 203M and provides voltage to the light emitting pixel electrodes 203L as same as the voltage provided to the switch pixel electrodes 203M, and provides voltage not equal to zero to the counter electrode 207A different from the voltage provided to the switch pixel electrodes 203M, that is, the voltages received by the switch pixel electrodes 203M and the light emitting pixel electrodes 203L are the same, but different from the voltage received by the counter electrode 207A.

The liquid crystal layer 205 is the vertical alignment liquid crystal layer, when the display device 1A is in the privacy mode, the display device 1A provides voltage not equal to zero to the light emitting pixel electrodes 203L and provides voltage to the counter electrode 207A as same as the voltage provided to the light emitting pixel electrodes 203L, and provides voltage not equal to zero to the switch pixel electrodes 203M different from the voltage provided to the light emitting pixel electrodes 203L, that is, the voltages received by the light emitting pixel electrodes 203L and the counter electrode 207A are the same, but different from the voltage received by the switch pixel electrodes 203M; when the display device 1A is in the share mode, the display device 1A provides voltage equal to zero or not equal to zero to the switch pixel electrodes 203M, provides voltage to the light emitting pixel electrodes 203L as same as the voltage provided to the switch pixel electrodes 203M, and provides voltage to the counter electrode 207A as same as the voltage provided to the switch pixel electrodes 203M, that is, the voltages received by the switch pixel electrodes 203M, the light emitting pixel electrodes 203L, and the counter electrode 207A are the same.

Figure 3:
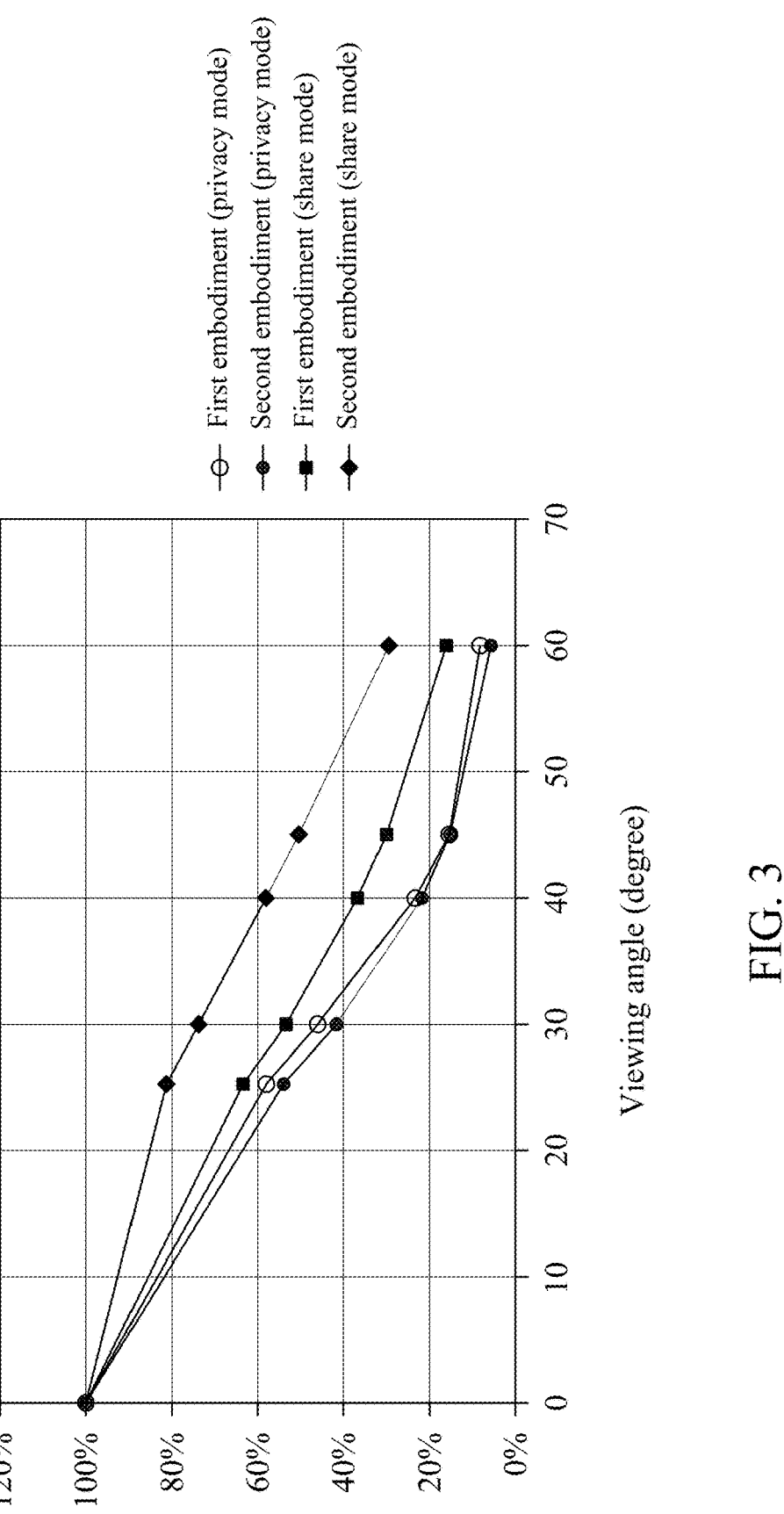
FIG. 3 is a transmittance ratio curve diagram of different viewing angles to the front viewing angle in a first embodiment and a second embodiment of the present disclosure.

FIG. 3 is a transmittance ratio curve diagram of different viewing angles to the front viewing angle in a first embodiment and a second embodiment of the present disclosure. The curve of the first embodiment is the measurement result obtained by the display device 1 as shown in FIG. 1A but without the polarizer 30, and the curve of the second embodiment is the measurement result obtained by the display device 1 as shown in FIG. 1A. The liquid crystal layer 205 of the first embodiment and the liquid crystal layer 205 of the second embodiment are the highly twisted nematic liquid crystal layers. As shown in FIG. 3, in the privacy mode, the transmittance ratio of different viewing angles to the front viewing angle of the first embodiment is higher than that of the second embodiment. That is, the light leakage of the first embodiment at non-front viewing angle is higher than that of the second embodiment at non-front viewing angle. In other words, in the privacy mode with narrow viewing angle, the display image of the first embodiment may be more easily seen by a viewer located at a viewing angle other than the front viewing angle (i.e., the user) compared to the display image of the second embodiment.

Referring to FIG. 3, in the share mode, the transmittance ratio of different viewing angles to the front viewing angle of the first embodiment is lower than that of the second embodiment, that is, the light emission of the first embodiment at non-front viewing angle is lower than the light emission of the second embodiment at non-front viewing angle, especially when the viewing angle is 45 degrees, the transmittance ratio to the front viewing angle in the first embodiment is about 30%, and the transmittance ratio to the front viewing angle in the second embodiment is about 50%, so 20% higher in the second embodiment than the first embodiment. That is, in the share mode with wide viewing angle, the brightness of the first embodiment is lower than the brightness of the second embodiment, and thus the display quality may be poorer. However, in the case where the liquid crystal layer 205 is the highly twisted nematic liquid crystal layer, the privacy mode and the share mode can be achieved without a polarizer. Therefore, whether or not to set a polarizer can be determined depending on the design requirement of the display device.

Figure 4:
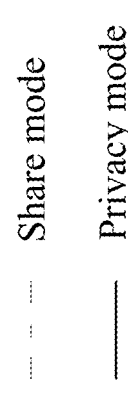
FIG. 4 is a brightness ratio curve diagram of different viewing angles to the front viewing angle in a third embodiment of the present disclosure.
Figure 4:
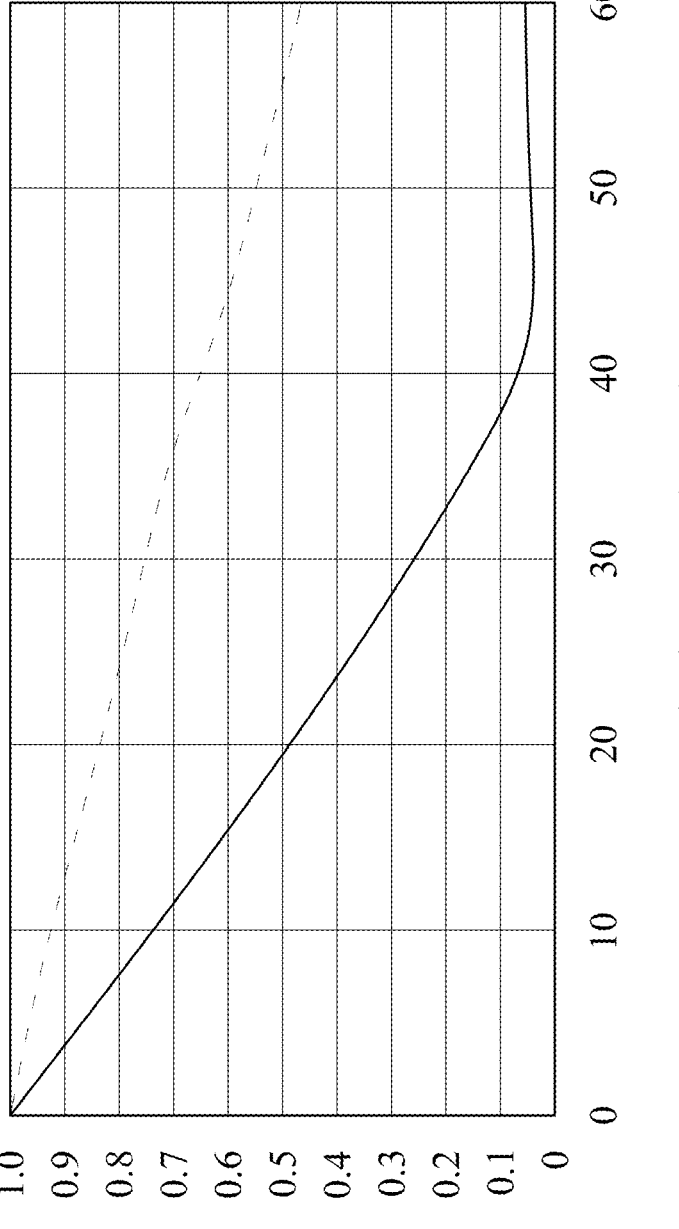

FIG. 4 is a brightness ratio curve diagram of different viewing angles to the front viewing angle in a third embodiment of the present disclosure. The curve of the third embodiment is the simulation result obtained by the display device 1 in FIG. 1A, and the liquid crystal layer 205 of the third embodiment is the vertical alignment liquid crystal layer or the electrically controlled birefringence liquid crystal layer. As shown in FIG. 4, in privacy mode, when the viewing angle is greater than 40 degrees, the brightness ratio to the front viewing angle is less than 0.1, that is, the light leakage when the viewing angle is greater than 40 degrees is not high. In other words, in the privacy mode with narrow viewing angle of the third embodiment, the display image is not easily seen by a viewer located at a viewing angle other than the front viewing angle (i.e., the user). In the share mode, when the viewing angle is greater than 40 degrees, the brightness ratio to the front viewing angle is higher than 0.4. Especially when the viewing angle is 45 degrees, the brightness ratio to the front viewing angle is still higher than 0.5. That is, in the share mode with wide viewing angle, the brightness of the display image still maintains a certain level, so the display quality can be maintained or improved.

In summary, in at least one embodiment of the display device of the present disclosure, by disposing the switch panel on the display panel, viewing modes with different viewing angles can be conveniently switched. Furthermore, by disposing the shielding pattern layer between the liquid crystal layer of the switch panel and the display panel and disposing the light transmitting layer between the liquid crystal layer and the shielding pattern layer, in addition to achieving a narrow viewing angle requirement for the privacy mode, the brightness requirement for the share mode with wide viewing angle also can be achieved to maintain or enhance the display quality for different viewing angles.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A display device, comprising:
a display panel; and
a switch panel, comprising:
  a first substrate, disposed on the display panel;
  a shielding pattern layer, disposed on the first substrate, and comprising a plurality of opening parts and a plurality of light shielding parts arranged alternately with the opening parts, wherein each of the light shielding parts has a first thickness;
  a light transmitting layer, disposed on the shielding pattern layer, and comprising a plurality of filling parts filling the opening parts and a plurality of extending parts arranged alternately with the filling parts, wherein each of the filling parts has a second thickness, and the second thickness is greater than the first thickness;
  a plurality of pixel electrodes, disposed on the light transmitting layer;
  a second substrate, disposed on the pixel electrodes; and a liquid crystal layer, disposed between the first substrate and the second substrate, wherein the light shielding parts are between the display panel and the liquid crystal layer, and the extending parts are between the light shielding parts and the liquid crystal layer.

2. The display device of claim 1, wherein each of the extending parts has a third thickness, and the third thickness is 0.5 to 1.5 times of the first thickness.

3. The display device of claim 1, wherein each of the opening parts has a width, and a first distance between the liquid crystal layer and each of the light shielding parts is not greater than the width.

4. The display device of claim 3, wherein a sum of the first thickness, the first distance and a thickness of the liquid crystal layer is not less than 2.5 times of the width.

5. The display device of claim 1, wherein a second distance between the liquid crystal layer and the light transmitting layer is in a range from 0.1 μm to 0.5 μm.

6. The display device of claim 1, further comprising:
a polarizer, disposed between the display panel and the switch panel, wherein the polarizer transmits a vertical polarized light and absorbs a horizontal polarized light.

7. The display device of claim 1, wherein the display device has a privacy mode and a share mode, and the pixel electrodes comprises a plurality of light emitting pixel electrodes corresponding to the opening parts and a plurality of switch pixel electrodes corresponding to the light shielding parts, wherein the light emitting pixel electrodes arranged alternately with the switch pixel electrodes.

8. The display device of claim 7, wherein when the display device is in the privacy mode, a voltage received by the light emitting pixel electrodes and a voltage received by the switch pixel electrodes are different; when the display device is in the share mode, a voltage received by the light emitting pixel electrodes and a voltage received by the switch pixel electrodes are the same.

9. The display device of claim 7, wherein when the display device is in the privacy mode, a power receiving mode of the light emitting pixel electrodes and a power receiving mode of the switch pixel electrodes are different; when the display device is in the share mode, a power receiving mode of the light emitting pixel electrodes and a power receiving mode of the switch pixel electrodes are the same.

10. The display device of claim 9, wherein the liquid crystal layer comprises an electrically controlled birefringence liquid crystal layer or a high twisted nematic liquid crystal layer, wherein when the display device is in the privacy mode, the display device provides voltage to the light emitting pixel electrodes but does not provide voltage to the switch pixel electrodes; when the display device is in the share mode, the display device provides voltage to the light emitting pixel electrodes and provides voltage to the switch pixel electrodes.

11. The display device of claim 9, wherein the liquid crystal layer comprises a vertical alignment liquid crystal layer, wherein when the display device is in the privacy mode, the display device provides voltage to the switch pixel electrodes but does not provide voltage to the light emitting pixel electrodes; when the display device is in the share mode, the display device does not provide voltage to the light emitting pixel electrodes and does not provide voltage to the switch pixel electrodes.

12. The display device of claim 1, wherein the liquid crystal layer comprises a dye.

13. The display device of claim 7, wherein the switch panel further comprises:
a counter electrode, wherein the liquid crystal layer is disposed between the pixel electrodes and the counter electrode.

14. The display device of claim 13, wherein the counter electrode comprises:
a plurality of light emitting electrode patterns, corresponding to the light emitting pixel electrodes; and
a plurality of switch electrode patterns, corresponding to the switch pixel electrodes, wherein the light emitting electrode patterns are arranged alternately with the switch electrode patterns.

15. The display device of claim 1, wherein the switch panel further comprises:
an insulating layer, disposed between the light transmitting layer and the pixel electrodes, and directly in contact with the pixel electrodes.

16. The display device of claim 15, wherein a material of the light transmitting layer comprises an organic insulating material, and a material of the insulating layer comprises an inorganic insulating material.

17. A display device, comprising:
a self-luminous display panel;
a switch panel, comprising:
a first substrate, disposed on the self-luminous display panel;
a shielding pattern layer, disposed on the first substrate, and comprising a plurality of opening parts and a plurality of light shielding parts arranged alternately with the opening parts, wherein each of the light shielding parts has a first thickness;
a light transmitting layer, disposed on the shielding pattern layer, and comprising a plurality of filling parts filling the opening parts and a plurality of extending parts arranged alternately with the filling parts, wherein each of the filling parts has a second thickness, and the second thickness is greater than the first thickness;
a plurality of pixel electrodes, disposed on the light transmitting layer;
a second substrate, disposed on the pixel electrodes; and
a liquid crystal layer, disposed between the first substrate and the second substrate, wherein the first substrate, the shielding pattern layer, the light transmitting layer, the pixel electrodes, the liquid crystal layer and the second substrate are stacked on the display panel in sequence; and
a circular polarizer, disposed between the self-luminous display panel and the switch panel.

18. The display device of claim 17, wherein the self-luminous display panel comprises a micro light emitting diode panel or an organic light emitting diode panel.

19. The display device of claim 1, wherein the pixel electrodes comprises a plurality of light emitting pixel electrodes corresponding to the opening parts and a plurality of switch pixel electrodes corresponding to the light shielding parts.

* * * * *